(12) United States Patent
Glessner, Jr. et al.

(10) Patent No.: US 8,308,863 B2
(45) Date of Patent: *Nov. 13, 2012

(54) LOW EMBODIED ENERGY CONCRETE MIXTURE

(76) Inventors: James Glessner, Jr., Santa Rosa, CA (US); Richard McCabe, Occidental, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 12/716,433

(22) Filed: Mar. 3, 2010

(65) Prior Publication Data

US 2010/0242803 A1    Sep. 30, 2010

Related U.S. Application Data

(63) Continuation-in-part of application No. 12/432,731, filed on Apr. 29, 2009, now Pat. No. 7,727,327.

(60) Provisional application No. 61/048,800, filed on Apr. 29, 2008.

(51) Int. Cl.
*C04B 18/08* (2006.01)

(52) U.S. Cl. ........ 106/644; 106/705; 106/713; 106/716; 106/737; 106/DIG. 1

(58) Field of Classification Search ................ 106/644, 106/705, 713, 716, 737, DIG. 1
See application file for complete search history.

(56) References Cited

U.S. PATENT DOCUMENTS

| | | |
|---|---|---|
| 4,210,457 A | 7/1980 | Dodson et al. |
| 4,997,484 A | 3/1991 | Gravitt et al. |
| 5,084,102 A | 1/1992 | Brouns et al. |
| 5,290,356 A | 3/1994 | Frankowski |
| 5,435,843 A | 7/1995 | Roy et al. |
| 5,456,751 A | 10/1995 | Zandi et al. |
| 5,525,153 A | 6/1996 | Cosola |
| 5,643,359 A | 7/1997 | Soroushian et al. |
| 5,690,729 A | 11/1997 | Jones |
| 5,714,003 A | 2/1998 | Styron |
| 5,736,594 A | 4/1998 | Boles et al. |
| 5,755,876 A | 5/1998 | Stokes et al. |
| 5,788,407 A | 8/1998 | Hwang |
| 5,803,960 A | 9/1998 | Baxter |
| 5,810,921 A | 9/1998 | Baxter et al. |
| 5,897,701 A | 4/1999 | Soroushian et al. |
| 5,916,361 A | 6/1999 | Molloy et al. |
| 5,989,335 A | 11/1999 | Soroushian et al. |
| 6,022,408 A | 2/2000 | Stokes et al. |
| 6,231,663 B1 | 5/2001 | Catterton et al. |
| 6,324,802 B1 | 12/2001 | Garrett |
| 6,344,081 B1 | 2/2002 | Pelot et al. |
| 6,669,321 B2 | 12/2003 | Yoshida |
| 6,695,909 B1 | 2/2004 | Zhu |
| 6,802,898 B1 | 10/2004 | Liskowitz et al. |
| 7,727,327 B2 * | 6/2010 | Glessner et al. ............ 106/644 |

* cited by examiner

*Primary Examiner* — Paul Marcantoni
(74) *Attorney, Agent, or Firm* — Muskin & Cusick, LLC; Shawn R. Farmer

(57) ABSTRACT

A method for making a low embodied energy cementitious mixture by blending a variety of post-consumer wastes, post-industrial wastes, as well as renewable, organic and recyclable materials with Portland cement or a material having similar cementitious properties. The primary materials are recycled concrete, coal-fired fly ash waste, silica fume, post-industrial waste, organic or inorganic waste fibers. Glass, brick, ceramics, ground tires and other waste products, as well as virgin aggregate can also be included in the low embodied energy cementitious mixture.

39 Claims, 1 Drawing Sheet

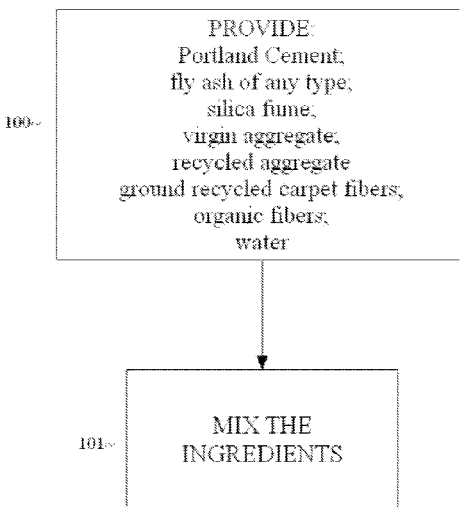

100 — PROVIDE:
Portland Cement;
fly ash of any type;
silica fume;
virgin aggregate;
recycled aggregate
ground recycled carpet fibers;
organic fibers;
water

101 — MIX THE INGREDIENTS

LOW EMBODIED ENERGY CONCRETE MIXTURE

CROSS REFERENCE TO RELATED APPLICATIONS

This application is a continuation in part of U.S. application Ser. No. 12/432,731, filed on Apr. 29, 2009, now U.S. Pat. No. 7,727,327 entitled, "Low Embodied Energy Concrete Mixture" (which is incorporated by reference herein in its entirety), which claims benefit to U.S. provisional application No. 61/048,800, filed on Apr. 29, 2008, entitled "Concrete Mixture" which is also incorporated by reference herein in its entirety.

FIELD OF THE INVENTION

A method is described for making a low embodied energy cementitious mixture by blending a variety of post-consumer wastes, post-industrial wastes, as well as renewable, organic and recyclable materials with Portland cement or a material having similar cementitious properties. The primary materials are recycled concrete, coal-fired fly ash waste, silica fume, post-industrial waste, organic or inorganic waste fibers. Glass, brick, ceramics, ground tires and other waste products can also be included. However, virgin gravel, sand, or other suitable virgin aggregate can be used in the described cementitious mixture.

BACKGROUND

Concrete is one of the most ubiquitous materials found in the modern world. It is one of the primary materials used to build almost every durable structure, large or small, comprising our cities and towns, including: sidewalks; roads; bridges; retaining walls; skyscrapers; building foundations; sewers; and hundreds of other structures. In short, concrete is used in every corner of the Earth and our way of life depends on its continued use.

Although concrete can be made in many ways with many additives and various methods for its creation and use, it is generally made with four parts gravel, two parts sand, one part Portland cement and water. These ingredients are mixed, poured into forms and allowed to set. This process has been repeated thousands of times every day for decades and decades.

Unfortunately, the manufacture of concrete's constituent parts creates an enormous amount of environmental havoc, which must be addressed. Huge quantities of sand, limestone and gravel must be mined or dredged each year to satisfy the requirements of concrete manufacture. These processes scar the Earth and must be performed using large machines, which burn a tremendous amount of fossil fuels, which also contribute to global warming. However, the carbon dioxide created by these processes pales in comparison to that required to manufacture Portland cement. The manufacture of one pound of Portland cement creates almost one pound of carbon dioxide due mostly to the decarbonation of limestone and the fuel burned to heat kilns to the required temperature of nearly 1500 degrees Celsius. International studies have shown that the manufacture of concrete leads to 5-8% of total $CO_2$ emitted worldwide.

To be more cost effective and to prevent excessive waste, concrete mixtures have been developed which use recycled materials to reduce any unnecessary environmental impacts. Recyclable materials exist in many manufacturing industries such as coal-generated electricity, various metal purification processes, silica production and cement and lime kilns to name a few. These mixtures generally consist of either the addition of an aggregate mixture, made of recycled concrete or the addition of fibers, such as plant fibers, carpet fibers, or rubber fibers. The recyclable materials that can be used in the concrete mixtures exist in many manufacturing industries such as coal-generated electricity, various metal purification processes, silica production and cement and lime kilns to name a few.

What is needed is a concrete mixture that uses all of the commonly available types of recycled materials, thus requiring little or no Portland cement, as well as using recycled aggregate replacement when possible to reduce landfill and destruction of our natural resources. Additionally, the concrete formed must have comparable strength, viscosity, and other characteristics comparable to that of standard concrete created only from virgin materials.

SUMMARY OF THE INVENTION

It is an aspect of the present inventive concept to provide for a low embodied energy concrete mixture that comprises a reduced amount of virgin materials and requires little or no Portland cement. Various aspects of the invention described herein may be applied to the particular instances set forth below or for a variety of other kinds of materials. It shall be understood that different aspects of the invention can be appreciated individually, collectively or in combination with each other. While the new methods described herein may be in conjunction with the manufacture of concrete that can range from small to bulk quantities, it shall be understood that these methods can be applied and used to manufacture other concrete-based building materials such as roof tiles, deck tiles, floor tiles, cement boards, masonry blocks, and other similar building materials.

The above aspect can be obtained by a concrete mixture comprised of an aggregate composed of recycled concrete and a cement portion made up a minimal amount of Portland cement, as well as fly ash, including hydrating fly ash, and ground blast furnace slag. The cement portion of the mixture comprises no more than 5% Portland cement, the bulk being made of recycled materials. The above aspect can also comprise virgin aggregate.

The above aspect can also be obtained through the addition of fibrous recycled materials to the aggregate and cement portions to increase the crack-resistance of the concrete. The fibrous material may be manufactured using recycled, finely-ground, tires, carpet, or waste rice hulls. The above aspect can also comprise recycled glass, and recycled E-glass.

The above aspect can also be obtained through the addition of silica fume, a waste product from steel production, or cement and lime kiln dust, waste products of the cement and lime industries respectfully, to the aggregate and cement portions with or without the addition of the fibrous materials. The addition of silica fume to the mixture increases the strength and reduces the water penetration, protecting steel reinforcements. The addition of cement or lime kiln dust to the mixture increases the strength and regulates the reaction timing, including set and curing speed.

In one aspect, a mixture of these materials can be created with the object of using the least amount of energy to create a given unit of concrete.

In another aspect, a mixture of these materials can be created with the object of using the least amount of energy while creating a concrete with a compressive strength in excess of 3000 p.s.i.

In another aspect, a mixture of these materials can be created with the object of using the least amount of energy while creating a concrete that has manufacturing costs similar to that of ordinary concrete.

In another aspect, a mixture of these materials can be created with the object of using the least amount of energy while creating a low slump, flowable concrete.

These, together with other aspects and advantages, which will subsequently become apparent, and reside in the details of construction and operation as more fully hereinafter described and claimed, reference being had to the accompanying drawing forming a part hereof, wherein like numerals refer to like parts throughout.

BRIEF DESCRIPTION OF THE DRAWINGS

FIG. 1 is a block diagram representing a method for creating a low embodied energy concrete mixture according to an embodiment.

DETAILED DESCRIPTION

The following detailed description of embodiments of the invention is illustrative only and not limiting. Other embodiments will be obvious to those skilled in the art in view of this description.

The novel process described in the exemplary embodiments for the manufacture of low embodied energy concrete is intended to be read in connection with the accompanying drawings, which are to be considered part of the entire written description.

Reference will now be made in detail to the presently preferred embodiments of the invention, examples of which are illustrated in the accompanying tables, wherein like reference numerals refer to like elements throughout.

In one embodiment, the present invention relates to a cementitious mixture which can comprise ground granulated blast furnace slag (GGBFS), fly ash of various grades, silica fume, recycled concrete, brick and other similar building materials, ground recycled carpet fiber, which can include nanoparticles, rice hulls and other organic fiber containing materials, and water. Portland cement is well known in the art and is the most common type of cement in general use, as it is a basic ingredient of concrete, mortar, stucco and most non-specialty grout.

FIG. 1 is a flowchart illustrating an exemplary method of implementing a method to create a cementitious mixture, according to an embodiment.

The method can begin with operation 100, wherein an operator creating the mixture provides ingredients which can comprise Portland cement (and/or GGBFS, lime kiln dust, cement kiln dust), fly ash of any type, silica fume, virgin aggregate, recycled aggregate, ground recycled carpet fibers, organic fibers (and/or high range water reducer), and water. Any of these ingredients can be optional, and additional ingredients can be added (e.g., high range water reducer, such as polycarboxylate or super plasticizer.)

In operation 102, the operator mixes the ingredients provided in operation 100. The ingredients can be mixed using any mixing equipment known in the art. For example, a drum mixer, pan mixer, or wheel barrel and shovel.

In an embodiment, a low energy content, cementitious mixture capable of replacing a typical 4:2:1 concrete mixture, in terms of compressive strength and slump properties, can be created using 4% to 6% Portland cement, 6% to 8% fly ash of any type, 2% to 4% silica fume as measured as a percent of the amount of Portland cement utilized, 2500 to 3600 pounds per cubic yard of recycled concrete, bricks or other recycled building materials per cubic yard of cementitious mixture created, 2.5 to 3.5 pounds per cubic yard of recycled carpet fibers further comprising nanoparticles, 5.5 to 6.5 pounds per cubic yard of rice hull waste fibers, and a 30% to 65% ratio (by weight) of water to the combined weight of Portland cement and fly ash used.

In a second embodiment, an extremely low energy content, cementitious mixture can be created using 0% to 2% Portland cement, 3% to 4% GGBFS, 6% to 8% fly ash of any type, 2% to 4% silica fume as measured as a percent of the amount of Portland cement utilized by weight, 2500 to 3600 per cubic yard pounds of recycled concrete, bricks or other recycled building materials per cubic yard of cementitious mixture created, 2.5 to 3.5 pounds per cubic yard of recycled carpet fibers further comprising nanoparticles, 5.5 to 6.5 pounds per cubic yard of rice hull waste fibers, and a 30% to 65% ratio (by weight) of water to the combined weight of Portland cement and fly ash used.

In a third embodiment, a low energy content, cementitious mixture, having a compressive strength greater than 8,000 p.s.i. can be created using approximately 5.5% Portland cement, approximately 8% fly ash of any type, approximately 15% silica fume as measured as a percent of the amount of Portland cement utilized by weight, 2500 to 3600 pounds per cubic yard of recycled concrete, bricks or other recycled building materials per cubic yard of cementitious mixture created, 2.5 to 3.5 pounds per cubic yard of recycled carpet fibers further comprising nanoparticles, 5.5 to 6.5 pounds per cubic yard of rice hull waste fibers, 1.25% to 1.75% high range water reducer measured as a percent of the amount of Portland cement utilized by weight, and a 25% to 65% ratio (by weight) of water to the combined weight of Portland cement and fly ash used.

In a fourth embodiment, a low energy content, cementitious mixture, having high flowability properties can be created using 4.5% to 5.5% Portland cement, 6% to 8% fly ash of any type, 2% to 4% silica fume as measured as a percent of the amount of Portland cement utilized by weight, 2500 to 3600 pounds per cubic yard of recycled concrete, bricks or other recycled building materials per cubic yard of cementitious mixture created, 2.5 to 3.5 pounds per cubic yard of recycled carpet fibers further comprising nanoparticles, 5.5 to 6.5 pounds per cubic yard of rice hull waste fibers, 1.25% to 1.75% high range water reducer measured as a percent of the amount of Portland cement utilized by weight, and a 20% to 65% ratio (by weight) of water to the combined weight of Portland cement and fly ash used.

Different Applications and Use of Post-Industrial Waste Like Materials

Several U.S. patents have described the use of some of the aforementioned post-industrial waste in the development of cementitious applications. It shall be understood that any of the waste components disclosed in the following patents, which are all incorporated by reference in their entirety, may be utilized with various aspects of the invention herein. For example, U.S. Pat. No. 5,435,843 discusses a cement composed of type C fly ash and an alkali metal activator for mortar and concrete applications. U.S. Pat. No. 4,997,484 requires the same with the addition of citric acid. In both patents there is no consideration of post-industrial wastes other than type C fly ash or mention of fine and course aggregate either virgin or of recycled nature. U.S. Pat. No. 5,714,003 expands the scope to use any sub-bituminous fly ash, and requires potassium carbonate, citric acid and retarding agent for general cement applications, but again contains no mention of other post-industrial wastes or the use of recycled aggregates. U.S. Pat.

No. 5,084,102 considers another post-industrial waste, blast furnace slag, as an ingredient for a ready-to-use dry powder that when combined with water can be used in concrete constructions, products or parts, but without consideration of lowering the embodied energy of concrete by using recycled aggregates or other post industrial waste sources.

The resulting low embodied energy concrete products herein may depend on the naturally occurring remaining composition of industrial processing of mined raw materials to form a self-hardening reaction. When harnessed effectively, hydration will initiate a self-hardening reaction within these "waste" materials. Because low embodied energy concrete may incorporate by-products that are not manufactured for specific chemical composition or further industrial use, each source can have a unique makeup when compared to other sources of the same material. Thus it is preferable or often times necessary to optimize with the specific chemical composition of each unique source for the best or desired combination of waste materials in wallboard end products.

The typical compositions of considered post-industrial waste materials follow, however these ranges are not representative of all waste material sources that may be considered useful in the low embodied energy concrete:

| Fly Ash Type C | |
|---|---|
| Component | Percentage |
| $SiO_2$ | 15-60 |
| $Al_2O_3$ | 10-30 |
| $Fe_2O_3$ | 4-15 |
| CaO | 5-40 |
| MgO | 1-10 |
| $SO_3$ | 0-10 |
| $Na_2O$ | 0-6 |
| $K_2O$ | 0-4 |
| LOI | 0-5 |

| Fly Ash Type F | |
|---|---|
| Component | Percentage |
| $SiO_2$ | 20-60 |
| $Al_2O_3$ | 5-35 |
| $Fe_2O_3$ | 10-40 |
| CaO | 1-12 |
| MgO | 0-5 |
| $SO_3$ | 0-4 |
| $Na_2O$ | 0-4 |
| $K_2O$ | 0-3 |
| LOI | 0-15 |

| Blast Furnace Slag | |
|---|---|
| Component | Percentage |
| $SiO_2$ | 27-38 |
| $Al_2O_3$ | 7-12 |
| $Fe_2O_3$ or FeO | 0.2-1.6 |
| CaO | 34-43 |
| MgO | 7-15 |
| MnO | 0.15-0.76 |
| S | 1-1.9 |

| Steel Slag | |
|---|---|
| Component | Percentage |
| $SiO_2$ | 10-19 |
| $Al_2O_3$ | 1-3 |
| $Fe_2O_3$ or FeO | 10-40 |
| CaO | 40-52 |
| MgO | 5-10 |
| MnO | 5-8 |
| S | 0-0.1 |
| $P_2O_5$ | 0.5-1 |
| Metallic Fe | 0.5-10 |

| Lime Kiln Dust | |
|---|---|
| Component | Percentage |
| CaO (free) | 17-25 |
| CaO | 56-60 |
| MgO | 1.1-4.9 |
| $SiO_2$ | 8-17 |
| $Al_2O_3$, $Fe_2O_3$, MnO, $TiO_2$, $P_2O_3$ | 5-5.5 |
| $CO_2$ | 13-18 |
| LOI | 14-23 |

| Cement Kiln Dust | |
|---|---|
| Component | Percentage |
| $Ca_2CO_3$ | 30-60 |
| $SiO_2$ | 10-20 |
| $Al_2O_3$ | 2-6 |
| $Fe_2O_3$ or FeO | 1-4 |
| CaO | 5-40 |
| MgO | 1-4 |
| $Na_2SO_4$ | 1-3 |
| $CaSO_4$ | 2-8 |
| $K_2SO_4$ | 3-9 |
| KCl | 1-3 |
| KF | 0.1-1 |

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A cementitious mixture comprising: Portland cement; fly ash; silica fume; virgin aggregate; ground recycled carpet fibers; organic fibers; and water.

2. The cementitious mixture described in claim 1, wherein the cementitious mixture further comprises recycled aggregate other than recycled carpet fibers.

3. The cementitious mixture described in claim 2, wherein the ground recycled carpet fibers comprise nanoparticles.

4. The cementitious mixture described in claim 2, wherein the recycled aggregate comprises crushed, recycled concrete.

5. The cementitious mixture described in claim 2, wherein the recycled aggregate comprises recycled glass.

6. The cementitious mixture described in claim 2, wherein the recycled aggregate comprises crushed concrete and bricks.

7. The cementitious mixture described in claim 1, wherein the Portland cement comprises between 0 wt % and 10 wt % of the mixture.

8. The cementitious mixture described in claim 1, wherein the organic fibers are rice hulls and other natural waste fibers.

9. The cementitious mixture described in claim 1, wherein comprising ground granulated blast furnace slag is substituted for some of the Portland cement.

10. The cementitious mixture described in claim 9, wherein the Portland cement comprises between 0 wt % and 7 wt % of the mixture.

11. The cementitious mixture described in claim 9, wherein the ground granulated blast furnace slag comprises between 3 wt % and 7 wt % of the mixture.

12. The cementitious mixture described in claim 9, wherein the organic fibers are rice hulls or other natural waste fibers.

13. The cementitious mixture described in claim 2, wherein the Portland cement comprises between 0 wt % and 10 wt % of the mixture.

14. The cementitious mixture described in claim 2, wherein the organic fibers are rice hulls and other natural waste fibers.

15. The cementitious mixture described in claim 2, wherein ground granulated blast furnace slag is substituted for some of the Portland cement.

16. The cementitious mixture described in claim 15, wherein the Portland cement comprises between 0 wt % and 7 wt % of the mixture.

17. The cementitious mixture described in claim 15, wherein the ground granulated blast furnace slag comprises between 3 wt % and 7 wt % of the mixture.

18. The cementitious mixture described in claim 15, wherein the organic fibers are rice hulls or other natural waste fibers.

19. The cementitious mixture described in claim 1, wherein lime kiln dust is substituted for some of the Portland cement.

20. The cementitious mixture described in claim 19, wherein the Portland cement comprises between 0 wt % and 7 wt % of the mixture.

21. The cementitious mixture described in claim 19, wherein the ground granulated blast furnace slag comprises 3 wt % and 7 wt % of the mixture.

22. The cementitious mixture described in claim 19, wherein the organic fibers are rice hull waste fibers.

23. The cementitious mixture described in claim 2, wherein lime kiln dust is substituted for some of the Portland cement.

24. The cementitious mixture described in claim 23, wherein the Portland cement comprises between 0 wt % and 7 wt % of the mixture.

25. The cementitious mixture described in claim 23, wherein the ground granulated blast furnace slag comprises between 3 wt % and 7 wt % of the mixture.

26. The cementitious mixture described in claim 23, wherein the organic fibers are rice hull waste fibers.

27. The cementitious mixture described in claim 1, wherein comprising cement kiln dust is substituted for some of the Portland cement.

28. The cementitious mixture described in claim 27, wherein the Portland cement comprises between 0 wt % and 7 wt % of the mixture.

29. The cementitious mixture described in claim 27, wherein the ground granulated blast furnace slag comprises between 3 wt % and 7 wt % of the mixture.

30. The cementitious mixture described in claim 27, wherein the organic fibers are rice hull waste fibers.

31. The cementitious mixture described in claim 2, wherein cement kiln dust is substituted for some of the Portland cement.

32. The cementitious mixture described in claim 31, wherein the Portland cement comprises between 0 wt % and 7 wt % of the mixture.

33. The cementitious mixture described in claim 31, wherein the ground granulated blast furnace slag comprises between 3 wt % and 7 wt % of the mixture.

34. The cementitious mixture described in claim 31, wherein the organic fibers are rice hull waste fibers.

35. A cementitious mixture comprising: Portland cement; fly ash; silica fume; virgin aggregate; ground recycled carpet fibers; organic fibers; high range water reducer; and water.

36. The cementitious mixture described in claim 35, wherein the Portland cement comprises between 0 wt % and 10 wt % of the mixture.

37. The cementitious mixture described in claim 35, wherein the organic fibers are rice hulls or other natural waste fibers.

38. A method to create a cementitious mixture, the method comprising:
   providing the following ingredients: Portland cement; fly ash; silica fume; virgin aggregate; recycled aggregate; ground recycled carpet fibers; organic fibers; and water; and
   mixing the ingredients.

39. The method to create a cementitious mixture according to claim 38, wherein the cementitious mixture comprises a high range water reducer.

* * * * *